US012709853B2

(12) United States Patent
McMullan

(10) Patent No.: US 12,709,853 B2
(45) Date of Patent: Aug. 18, 2026

(54) ANCHORING SYSTEM FOR A HYDROKINETIC GENERATOR

(71) Applicant: Sitkana, Inc., Juneau, AK (US)

(72) Inventor: Lance D. McMullan, Seattle, WA (US)

(73) Assignee: SITKANA, INC., Juneau, AK (US)

( * ) Notice: Subject to any disclaimer, the term of this patent is extended or adjusted under 35 U.S.C. 154(b) by 139 days.

(21) Appl. No.: 18/407,203

(22) Filed: Jan. 8, 2024

(65) Prior Publication Data

US 2025/0223769 A1 Jul. 10, 2025

(51) Int. Cl.
*E02B 9/08* (2006.01)
*F03B 13/10* (2006.01)

(52) U.S. Cl.
CPC ................ *E02B 9/08* (2013.01); *F03B 13/10* (2013.01)

(58) Field of Classification Search
CPC .. E02B 9/08; F03B 13/10; F03B 13/14; F03B 13/181; F03B 17/061
USPC ........................................................ 405/75, 76
See application file for complete search history.

(56) References Cited

U.S. PATENT DOCUMENTS

| | | | | |
|---|---|---|---|---|
| 5,230,215 | A * | 7/1993 | Nagata | E02B 9/08 416/197 A |
| 9,352,805 | B2 * | 5/2016 | Kawabe | B63B 21/20 |
| 9,745,951 | B1 * | 8/2017 | Doyle | F03B 17/061 |
| 10,151,294 | B2 * | 12/2018 | Fan | F03B 13/183 |
| 10,788,010 | B2 * | 9/2020 | Rohrer | F03B 13/182 |
| 11,353,001 | B1 * | 6/2022 | McMullan | F03B 17/061 |
| 2009/0140524 | A1 * | 6/2009 | Kejha | F03B 17/061 290/52 |
| 2010/0230971 | A1 * | 9/2010 | Mackie | F03B 17/061 290/54 |
| 2012/0212350 | A1 * | 8/2012 | Magnell | F03B 13/10 367/134 |
| 2013/0139499 | A1 * | 6/2013 | Kerckove | F03B 17/061 60/504 |
| 2014/0038479 | A1 * | 2/2014 | Johnstone | B63B 22/18 114/294 |
| 2017/0356416 | A1 * | 12/2017 | Fan | F03B 17/061 |
| 2022/0325688 | A1 * | 10/2022 | Duquette | F03B 17/061 |

FOREIGN PATENT DOCUMENTS

| | | | | |
|---|---|---|---|---|
| ES | 2890973 T3 * | 1/2022 | | F03B 13/183 |
| KR | 101723061 B1 * | 4/2017 | | F03B 17/061 |
| KR | 101850900 B1 * | 4/2018 | | F03B 13/264 |

* cited by examiner

*Primary Examiner* — Frederick L Lagman
(74) *Attorney, Agent, or Firm* — Seed Intellectual Property Law Group LLP

(57) ABSTRACT

An anchoring system for a hydrokinetic generator system, the anchoring system including a slip ring attached to a buoy and coupleable to an output power line, a swivel joint on the buoy to rotate about a longitudinal axis, a rigid arm attachable to the hydrokinetic generator system and to the swivel joint to allow pivoting of the hydrokinetic generator system about the buoy, and electrical coupling of the onshore transmission cable to the slip ring to enable transmission of electrical energy from the hydrokinetic generator system to the output power line, through the slip ring, and out to the onshore transmission cable at all times, including during times the hydrokinetic generator system is repositioning about the buoy in response to a change in direction of the current of water.

6 Claims, 2 Drawing Sheets

ANCHORING SYSTEM FOR A HYDROKINETIC GENERATOR

BACKGROUND

Technical Field

The present disclosure is directed to securing objects to the floor of a body of water and, more particularly, to an anchoring system for a submerged generator system for use in a stream of water that maintains directional stability and while permitting lateral movement of the generator system in response to movement of the stream of water.

Description of the Related Art

Tidal energy is a largely untapped resource. The ocean's tide is the rising and falling of the sea-level due to the gravitational forces of the moon, Earth, and sun. This cycle generally happens twice a day and is predictable and reliable. The tides are also stronger with increasing latitude due to the Earth rotating on a tilted axis. For example, the Gulf of Mexico on the Texan coast has an average tidal fluctuation of two feet, while the Pacific Ocean off the coast of Southeast Alaska can have an average tidal fluctuation of over twelve feet.

If certain geological conditions are met, tides can generate powerful currents. First, there must be a large body of water separated from the ocean by a narrow inlet. Second, there must be a large tidal fluctuation. In these situations, a large volume of water (equal to the surface area of the body of water multiplied by the height of the tide) must pass through the narrow inlet each tidal cycle. This volume of water flows in as the tide rises and rushes out as the tide falls, essentially forming a river that changes directions four times per day.

These conditions are met in many locations along the Pacific coast of North America in both the United States and Canada. In the United States, there are at least twenty-one locations which are primarily located in the fjords between Washington State and Southeast Alaska, but also include San Francisco Bay and Humboldt Bay in California.

The power available in these twenty-one locations is 270 TWh/year, which is equal to 6.7% of the United States' power consumption and is worth approximately $26B/year. Currently, none of this is being collected to be used by coastal communities due to a lack of cost-effective technology.

One of the biggest technological issues facing tidal energy is the transmission of electricity from a hydrokinetic generator device to an onshore power grid. Most of the energy in a tidal current is near the surface of the water, so floating platforms are ideal for installing hydrokinetic generator devices. Technology exists in which a four-anchor system keeps a floating platform stationary throughout tidal cycles, which allows a power cable to run along the seafloor and then up to the floating platform, but this system requires shallow water and could not be effectively installed in the deep water of the Pacific. The current switches direction four times each day, so a floating platform would also turn around four times. Any electrical cables could get twisted, or the anchor line could get tangled with any suspended devices.

There is a need to develop a system to transmit electricity from a floating platform to shore, while adjusting for the direction of the tidal current. The system should prevent the twisting of electrical cables and prevent the anchor line from getting tangled with any suspended devices.

BRIEF SUMMARY

The present disclosure relates to an anchoring system for a hydrokinetic generator system that provides for the transmission of electric power generated in marine tidal currents. More particularly, the anchoring system of the present disclosure is designed to tether the hydrokinetic generator system to an anchor on a seabed or streambed and enable the hydrokinetic generator system to move laterally in response to a change in direction of the tidal currents or stream current.

In accordance with one aspect of the present disclosure, an anchoring system is provided for a hydrokinetic generator system that is structured to be anchored to the floor of a body of water that has a current of water flowing over the floor, the hydrokinetic generator system having an output power line to transmit generated electricity to an onshore transmission cable. The anchoring system includes an anchor structured to rest on the floor of the body of water, a buoy structured to float on the body of water, an anchor line structured to be coupled to the buoy and to the anchor, a swivel joint attached to the buoy and structured to rotate about a longitudinal axis, a rigid arm structured to be attached to the hydrokinetic generator system and to the swivel joint to allow pivoting of the hydrokinetic generator system about the longitudinal axis of the swivel joint and hence repositioning of the hydrokinetic generator system about the buoy.

In accordance with another aspect of the anchoring system, a slip ring attached to the buoy is provided, the slip ring structured to connect to the output power line of the hydrokinetic generator to enable transmission of electrical energy from the hydrokinetic generator system to the output power line, through the slip ring, the swivel joint, and out to the onshore transmission cable at all times, including during times the hydrokinetic generator system is repositioning about the buoy in response to a change in direction of the current of water.

In accordance with a further aspect of the present disclosure, the foregoing anchoring system includes a suspension line structured to be attached to the buoy, and a suspension weight structured to be attached to the suspension line, wherein the anchor line has a first end attached to the anchor and a second end coupled to one or both of the suspension weight and the suspension line.

In accordance with still yet another aspect of the present disclosure, an anchoring system for use with an anchor and an anchor line attached to the anchor for tethering a power transmission buoy to a sea floor is provided. The anchoring system includes a suspension line structured to be attached to the power transmission buoy, and a suspension weight structured to be attached to the suspension line to tether the power transmission buoy to the sea floor and prevent entanglement with the anchor line.

In accordance with a further aspect of the foregoing anchoring system for use with an anchor, the anchoring system further includes a swivel joint attached to the floating object and structured to rotate about a longitudinal axis, and a rigid arm structured to be attached to a hydrokinetic generator system and to the swivel joint to allow pivoting of the hydrokinetic generator system about the longitudinal axis of the swivel joint and hence repositioning of the hydrokinetic generator system about the floating object.

In accordance with still yet another aspect of the present disclosure, a power transmission buoy is provided for use with an anchor and an anchor line to anchor a hydrokinetic generator system to the floor of a body of water that has a current of water flowing over the floor, the hydrokinetic generator system having an output power line to transmit generated electricity to an onshore transmission cable. The power transmission buoy includes a buoy, a swivel joint attached to the buoy and structured to rotate about a longitudinal axis, a rigid arm structured to be attached to the hydrokinetic generator system and to the swivel joint to allow pivoting of the hydrokinetic generator system about the longitudinal axis of the swivel joint and hence repositioning of the hydrokinetic generator system about the buoy.

In accordance with a further aspect of the foregoing power transmission buoy, a slip ring is attached to the buoy and is structured to connect to the output power line of the hydrokinetic generator and to be electrically coupled to the onshore transmission cable to enable transmission of electrical energy from the hydrokinetic generator system to the output power line, through the slip ring, the swivel joint, and out to the onshore transmission cable at all times, including during times the hydrokinetic generator system is repositioning about the buoy in response to a change in direction of the current of water.

In accordance with another aspect of the present disclosure, the power transmission buoy includes a suspension line structured to be attached to the buoy, a suspension weight structured to be attached to the suspension line, and the suspension line is structured to be attached to a first end of the anchor line.

BRIEF DESCRIPTION OF THE SEVERAL VIEWS OF THE DRAWINGS

The foregoing features and advantages of the present disclosure will be more readily appreciated as the same become better understood from the following detailed description when taken in conjunction with the accompanying drawings, wherein.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with buoys, anchors, electric generators, floating platforms, and generator control systems have not been shown or described in order to avoid unnecessarily obscuring descriptions of the implementations.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

Figure 1:
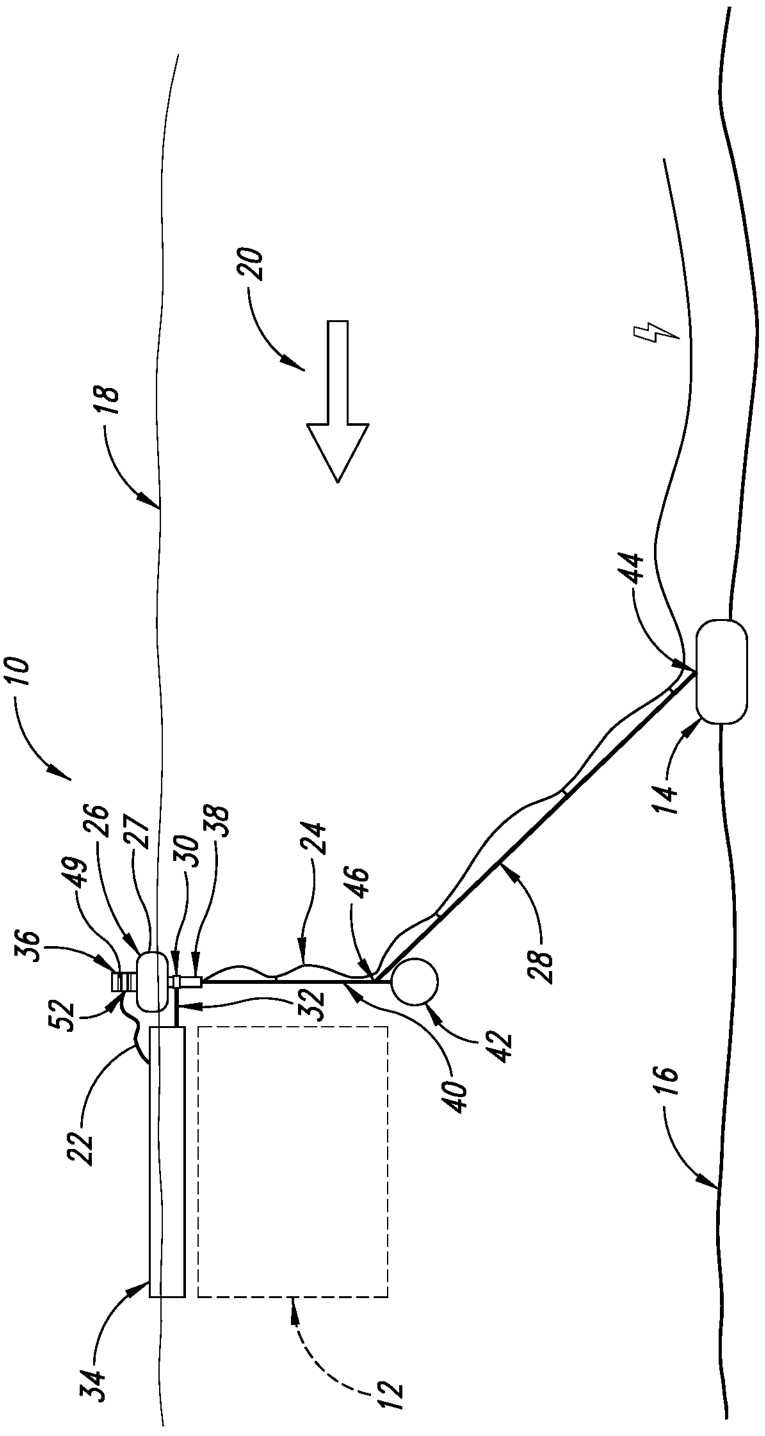
FIG. 1 is a side view of an anchoring system for a hydrokinetic generator system formed in accordance with the present disclosure.

Referring initially to FIG. 1, shown therein is an anchoring system 10 for a hydrokinetic generator system 12 that provides for the transmission of electric power generated in marine tidal currents. More particularly, the anchoring system 10 is designed to tether the hydrokinetic generator system 12 to an anchor 14 on a floor 16 (such as a seabed or streambed) of a body of water 18 and enable the hydrokinetic generator system 12 to move laterally on the body of water 18 in response to a change in direction of a tidal current 20 (or stream current).

The hydrokinetic generator system 12 has an output power line 22 to transmit generated electricity to an onshore transmission cable 24 that is electrically connected to an onshore receiving system, such as a distribution line, a power plant, a transformer, or other well-known receiving system for processing, using, or distributing the generated electrical power. In accordance with a representative implementation of the present disclosure, the anchoring system 10 includes the anchor 14 structured to rest on the floor 16 of the body of water 18, a buoy, such as a power transmission buoy 26 formed in accordance with the present disclosure and described more fully herein and which includes a buoy 27 structured to float on the body of water 18. An anchor line 28 is structured to be coupled to the buoy 27 and to the anchor 14.

The power transmission buoy 26 includes a swivel joint 30 structured to rotate about a longitudinal axis. A rigid arm 32 is structured to be attached to the hydrokinetic generator system 12, such as a flotation support 34, and to the swivel joint 30 to allow pivoting of the hydrokinetic generator system 12 about the longitudinal axis of the swivel joint 30 and hence repositioning of the hydrokinetic generator system 12 about the power transmission buoy 26.

In accordance with another aspect of the anchoring system 10, a slip ring 36 is attached to or built into the buoy 27 and is structured to provide an electrical connection to the output power line 22 of the hydrokinetic generator system 12. A fitting 38 is provided on the swivel joint 30 and is structured to provide for passage of the onshore transmission cable through the fitting, and which provides for electrical coupling of the onshore transmission cable to the slip ring 36 and enable transmission of electrical energy from the hydrokinetic generator system 12 to the output power line 22, through the slip ring 36, the swivel joint 30, and out to the onshore transmission cable 24 at all times, including during times the hydrokinetic generator system 12 is repositioning about the buoy 26 in response to a change in direction of the current of water 20.

In accordance with a further aspect of the present disclosure, the foregoing anchoring system includes a suspension line 40 structured to be attached to the buoy 27, and a suspension weight 42 structured to be attached to the suspension line 40. The anchor line 28 has a first end 44 attached to the anchor 14 and a second end 46 coupled to one or both of the suspension weight 42 and the suspension line 40.

Figure 2:
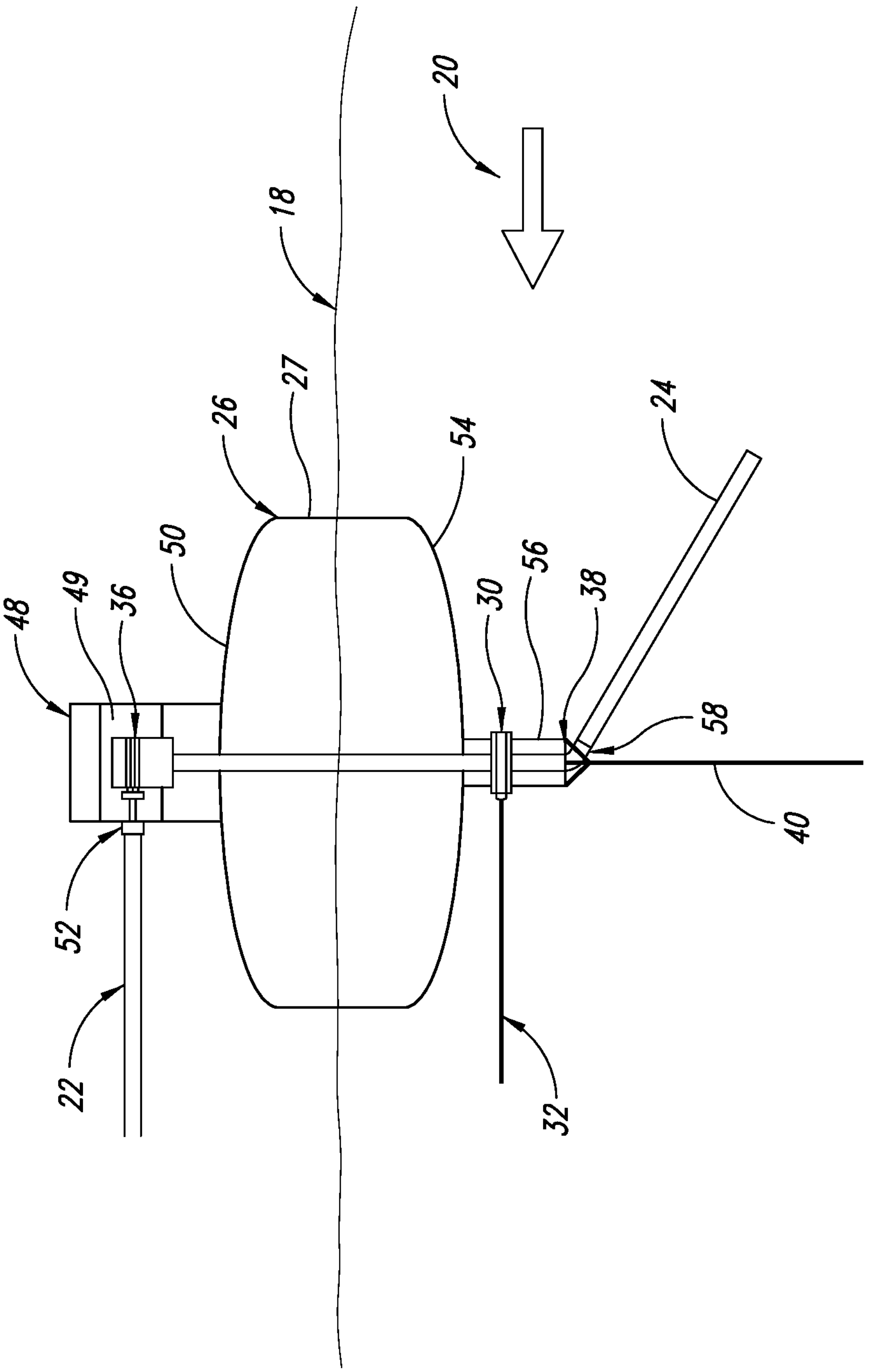
FIG. 2 is an enlarged side elevational view in partial cross section of the anchoring system of FIG. 1.

As shown more clearly in FIG. 2, the power transmission buoy 26 is structured to float in the body of water 18 so that the slip ring 36 is part of and located inside a slip ring housing 48, preferably waterproof housing 48, on a top surface 50 of the buoy 26. A section 49 of the housing 48 rotates while the remainder of the slip ring housing 48 stays stationary with respect to the buoy body 50. In this way the slip ring 36 is kept away from the water 18 to stay dry inside the housing 48 while enabling the slip ring to rotate in response to changes in the position of the hydrokinetic generator system 12. The output power line 22 is attached to the housing 48 at a junction 52 to provide a waterproof connection between the slip ring 36 and the output power line 22. Preferably the housing 48 is non-movable with respect to the buoy 48, and rotational movement of the output power line 22 is in conjunction with rotational movement of the rigid arm 32 about a vertical axis of the swivel joint 30.

As shown more clearly in FIG. 2, the swivel joint is attached to a bottom surface 54 of the power transmission buoy 26 via a tube 56. An opening 58 in a bottom of the tube 56 provides an entrance for the onshore transmission cable 24. The tube 56 also provides a connection point for the suspension line 40.

The rigid arm 32 is attached to the swivel joint 30 on the tube 56 to rotate about a rotational axis, e.g., the longitudinal axis (which is vertically oriented). This facilitates movement of the hydrokinetic generator system 12 about the power transmission buoy 26 in response to changes in the direction of the water current 20.

The various implementations described above can be combined to provide further implementations. Aspects of the implementations can be modified, if necessary to employ concepts of the various patents, applications and publications to provide yet further implementations.

For example, in accordance with the foregoing description, an anchoring system can be implemented for use with the anchor 14 and anchor line 28 for tethering the power transmission buoy 26 to the sea or river floor 16. The anchoring system includes the suspension line 40 structured to be attached to the power transmission buoy 26, and the suspension weight 42 structured to be attached to the suspension line 40 to tether the power transmission buoy 26 to the sea floor and prevent entanglement with the anchor line 28.

In accordance with still yet another implementation of the present disclosure, a power transmission buoy 26 is provided for use with the anchor 14 and the anchor line 28 to anchor a hydrokinetic generator system 12 to the floor 16 of the body of water 18 that has a current of water 20. The hydrokinetic generator system 12 has the output power line 22 to transmit generated electricity to the onshore transmission cable 24. The power transmission buoy 26 includes the buoy 27 itself, the swivel joint 30 attached to the buoy 27 and structured to rotate about a rotational or longitudinal axis, the rigid arm 32 structured to be attached to the hydrokinetic generator system 12 and to the swivel joint 30 to allow pivoting of the hydrokinetic generator system 12 about the longitudinal axis of the swivel joint 30 and, hence, repositioning of the hydrokinetic generator system 12 about the power transmission buoy 26.

The power transmission buoy 26 includes the slip ring 36 attached to the buoy 27 and structured to connect to the output power line 22 of the hydrokinetic generator system 12, and a fitting 38 on the swivel joint 30 for the passage of the onshore transmission cable 24. The slip ring 36 and structured to be electrically coupled to the onshore transmission cable 24 to enable transmission of electrical energy from the hydrokinetic generator system 12 to the output power line 22, through the slip ring 36, and out to the onshore transmission cable 24 at all times, including during times the hydrokinetic generator system 12 is repositioning about the power transmission buoy 26 in response to a change in direction of the current of water 20.

The power transmission buoy 26 can include the suspension line 40 structured to be attached to the buoy 27, the suspension weight 42 structured to be attached to the suspension line 40, and the suspension line 40 is structured to be attached to a first end 44 of the anchor line 28.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An anchoring system for a hydrokinetic generator system that is structured to be anchored to a floor of a body of water that has a current of water flowing over the floor, the hydrokinetic generator system having an output power line to transmit generated electricity to an onshore transmission cable, the anchoring system comprising:

an anchor structured to rest on the floor of the body of water;

a buoy structured to float on the body of water;

an anchor line structured to be coupled to the buoy and to the anchor;

a swivel joint attached to the buoy and structured to rotate about a longitudinal axis;

a rigid arm structured to be attached to the hydrokinetic generator system and to the swivel joint to allow pivoting of the hydrokinetic generator system about the longitudinal axis of the swivel joint and hence repositioning of the hydrokinetic generator system about the buoy; and a slip ring attached to the buoy and structured to connect to the output power line of the hydrokinetic generator to enable transmission of electrical energy from the hydrokinetic generator system to the output power line, through the slip ring, and out to the onshore transmission cable at all times, including during times the hydrokinetic generator system is repositioning about the buoy in response to a change in direction of the current of water.

2. The anchoring system of claim 1, further comprising:

a suspension line structured to be attached to the buoy;

a suspension weight structured to be attached to the suspension line; and wherein the anchor line has a first end attached to the anchor and a second end coupled to one or both of the suspension weight and the suspension line.

3. An anchoring system for use with an anchor and an anchor line attached to the anchor for tethering a buoy to a sea floor, the system comprising:

a suspension line structured to be attached to the buoy;

a suspension weight structured to be attached to the suspension line to tether the buoy to the sea floor and prevent entanglement with the anchor line;

a swivel joint attached to the buoy and structured to rotate about a longitudinal axis; and a rigid arm structured to be attached to a hydrokinetic generator system and to the swivel joint to allow pivoting of the hydrokinetic generator system about the longitudinal axis of the swivel joint and hence repositioning of the hydrokinetic generator system about the buoy, wherein the suspension line is directly coupled to a first end of the anchor line opposite the anchor.

4. A power transmission buoy for use with an anchor and an anchor line to anchor a hydrokinetic generator system to a floor of a body of water that has a current of water flowing over the floor, the hydrokinetic generator system having an output power line to transmit generated electricity to an onshore transmission cable, the power transmission buoy comprising:

a buoy;

a swivel joint attached to the buoy and structured to rotate about a longitudinal axis;

a rigid arm structured to be attached to the hydrokinetic generator system and to the swivel joint to allow pivoting of the hydrokinetic generator system about the longitudinal axis of the swivel joint and hence repositioning of the hydrokinetic generator system about the buoy; and a slip ring attached to the buoy and structured to connect to the output power line of the hydrokinetic generator to enable transmission of electrical energy from the hydrokinetic generator system to the output power line, through the slip ring, and out to the onshore transmission cable at all times, including during times the hydrokinetic generator system is repositioning about the buoy in response to a change in direction of the current of water.

5. The power transmission buoy of claim 4, further comprising:

a suspension line structured to be attached to the buoy;

a suspension weight structured to be attached to the suspension line; and wherein the suspension line is structured to be attached to a first end of the anchor line.

6. A power transmission buoy for use with an anchor and an anchor line to anchor a hydrokinetic generator system to a floor of a body of water that has a current of water flowing over the floor, the hydrokinetic generator system having an output power line to transmit generated electricity to an onshore transmission cable, the power transmission buoy comprising:

a buoy;

a swivel joint attached to the buoy and structured to rotate about a longitudinal axis;

a rigid arm structured to be attached to the hydrokinetic generator system and to the swivel joint to allow pivoting of the hydrokinetic generator system about the longitudinal axis of the swivel joint and hence repositioning of the hydrokinetic generator system about the buoy;

a suspension line structured to be attached to the buoy; and a suspension weight structured to be attached to the suspension line, wherein the suspension line is structured to be attached to a first end of the anchor line.

* * * * *